(12) United States Patent
Lee et al.

(10) Patent No.: US 11,838,485 B2
(45) Date of Patent: Dec. 5, 2023

(54) METHOD FOR PROCESSING IMMERSIVE VIDEO AND METHOD FOR PRODUCING IMMERSIVE VIDEO

(71) Applicant: Electronics and Telecommunications Research Institute, Daejeon (KR)

(72) Inventors: Gwang Soon Lee, Daejeon (KR); Jun Young Jeong, Daejeon (KR); Kug Jin Yun, Daejeon (KR); Hong Chang Shin, Daejeon (KR); Ho Min Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 260 days.

(21) Appl. No.: 17/233,151

(22) Filed: Apr. 16, 2021

(65) Prior Publication Data

US 2021/0329209 A1 Oct. 21, 2021

(30) Foreign Application Priority Data

Apr. 16, 2020 (KR) .................. 10-2020-0046127
Apr. 22, 2020 (KR) .................. 10-2020-0048837

(Continued)

(51) Int. Cl.
*H04N 13/111* (2018.01)
*H04N 13/178* (2018.01)
*H04N 13/161* (2018.01)

(52) U.S. Cl.
CPC ......... *H04N 13/111* (2018.05); *H04N 13/161* (2018.05); *H04N 13/178* (2018.05)

(58) Field of Classification Search
CPC .. H04N 13/111; H04N 13/161; H04N 13/178; H04N 19/70; H04N 19/597

(Continued)

(56) References Cited

U.S. PATENT DOCUMENTS

2012/0122062 A1   5/2012   Yang et al.
2014/0098883 A1*  4/2014   Hannuksela ......... H04N 19/597
                                                       375/240.12

(Continued)

FOREIGN PATENT DOCUMENTS

KR   101369745 B1   3/2014
KR   101629103 B1   6/2016
KR   101898822 B1   9/2018

OTHER PUBLICATIONS

Basel Salahieh et al., Test Model 5 for Immersive Video, International Organisation for Standardisation Organisation Internationale De Normalisation ISO/IEC JTC 1/SC 29/WG 11 Coding of Moving Pictures and Audio, N19213, Apr. 2020, Alpbach (AU) Virtual.

(Continued)

*Primary Examiner* — Thai Q Tran
*Assistant Examiner* — Stephen R Smith
(74) *Attorney, Agent, or Firm* — William Park & Associates Ltd.

(57) ABSTRACT

A method of producing an immersive video comprises decoding an atlas, parsing a flag for the atlas, and producing a viewport image using the atlas. The flag may indicate whether the viewport image is capable of being completely produced through the atlas, and, according to a value of the flag, when the viewport image is produced, it may be determined whether an additional atlas is used in addition to the atlas.

14 Claims, 16 Drawing Sheets

(30) Foreign Application Priority Data

| Jun. 8, 2020 | (KR) | .......................... 10-2020-0069280 |
| Jun. 23, 2020 | (KR) | .......................... 10-2020-0076804 |
| Jun. 29, 2020 | (KR) | .......................... 10-2020-0079153 |
| Apr. 15, 2021 | (KR) | .......................... 10-2021-0049424 |

(58) Field of Classification Search
USPC .......................................................... 348/43
See application file for complete search history.

(56) References Cited

U.S. PATENT DOCUMENTS

| 2015/0317057 | A1  | 11/2015 | Choi et al. |           |
| 2021/0176496 | A1* | 6/2021  | Chupeau     | H04N 19/65 |
| 2021/0218999 | A1* | 7/2021  | Schwarz     | H04N 19/70 |
| 2021/0281879 | A1* | 9/2021  | Roimela     | G06T 9/001 |
| 2022/0159298 | A1* | 5/2022  | Boyce       | H04N 19/70 |
| 2022/0167015 | A1* | 5/2022  | Fleureau    | H04N 19/597 |
| 2022/0232261 | A1* | 7/2022  | Zakharchenko | H04N 19/597 |
| 2022/0239949 | A1* | 7/2022  | Hannuksela  | H04N 19/105 |
| 2022/0343549 | A1* | 10/2022 | Chupeau     | H04N 21/816 |
| 2022/0353532 | A1* | 11/2022 | Zakharchenko | G06T 19/006 |
| 2022/0360819 | A1* | 11/2022 | Huang       | G06T 15/08 |
| 2022/0368879 | A1* | 11/2022 | Fleureau    | H04N 13/161 |
| 2023/0007277 | A1* | 1/2023  | Salahieh    | H04N 19/169 |
| 2023/0007338 | A1* | 1/2023  | Travert     | H04N 13/161 |
| 2023/0050860 | A1* | 2/2023  | Ilola       | G06T 17/20 |

OTHER PUBLICATIONS

Jill Boyce et al., Candidate MIV specification text, Information technology—Coded Representation of Immersive Media—Part 12: Immersive Video, International Organisation for Standardisation Organisation Internationale De Normalisation, ISO/IEC JTC1/SC29/WG11, Coding of Moving Pictures and Audio, Jan. 2020, Belgium, Brussels.

Working Draft 5 of Immersive Video, Information technology—Coded Representation of Immersive Media—Part 12: Immersive Video, ISO/IEC JTC 1/SC 29/WG 11 N19001, 2019, Switzerland.

* cited by examiner

```
Spatial_infromation ( ) {
    si_num_spatial_region_minus1
    for(i = 0; i < si_num_spatial_region_minus1; i++){
        si_spatial_region_id[ i ]
        si_num_group_minus1
        for(j = 0; j < si_num_group_minus1; j++){
            si_group_id[ i ][j]
            si_num_tile_id_minus1
            for(k = 0; k < si_num_atgh_minus1; k++){
                si_tile_id[j][k]
            }
        }
    }
}
```

FIG. 10

| Miv_view_params_list( ) { | Descriptor |
|---|---|
|   mvp_num_views_minus1 | u(16) |
|   mvp_pruning_graph_params_present_flag | u(1) |
|   if ( mvp_pruning_graph_params_present_flag ) | |
|     for( v = 0; v <= mvp_num_views_minus1; v++ ){ | |
|       viewID = ViewIndexToID[ v ] | |
|       pruning_parents(viewID ) | |
|       color_depth_quality_flag[viewID ] } | |
| } | |

(a)

| pruning_parents ( viewID ) { | Descriptor |
|---|---|
|   pp_is_root_flag[viewID] | u(1) |
|   if ( pp_is_root_flag[viewID ] ) | |
|     color_depth_quality_flag[viewID] | |
|   if ( pp_is_root_flag[viewID ] == 0 ) { | |
|     pp_num_parents_minus1 [viewID ] | u(v) |
|     color_depth_quality_flag[viewID] | |
|     for ( i = 0; i <= pp_num_parents_minus1[viewID]; i++ ) | |
|       pp_parent_id [viewID ][ i ] | u(v) |
|   } | |
| } | |

(b)

FIG. 12
```
frame_count( ) {
        fc_num_frame
        fc_count(i)
}
```
FIG. 13
▨ Atlas1 or Group1
▪ Atlas2 or Group2
▩ Atlas3 or Group3
FIG. 14
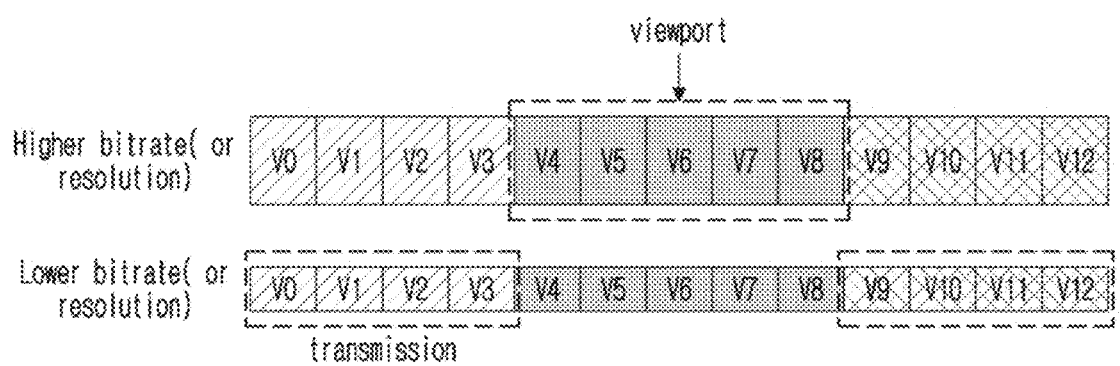
▨ Atlas1 or Group1
▪ Atlas2 or Group2
▩ Atlas3 or Group3

FIG. 17
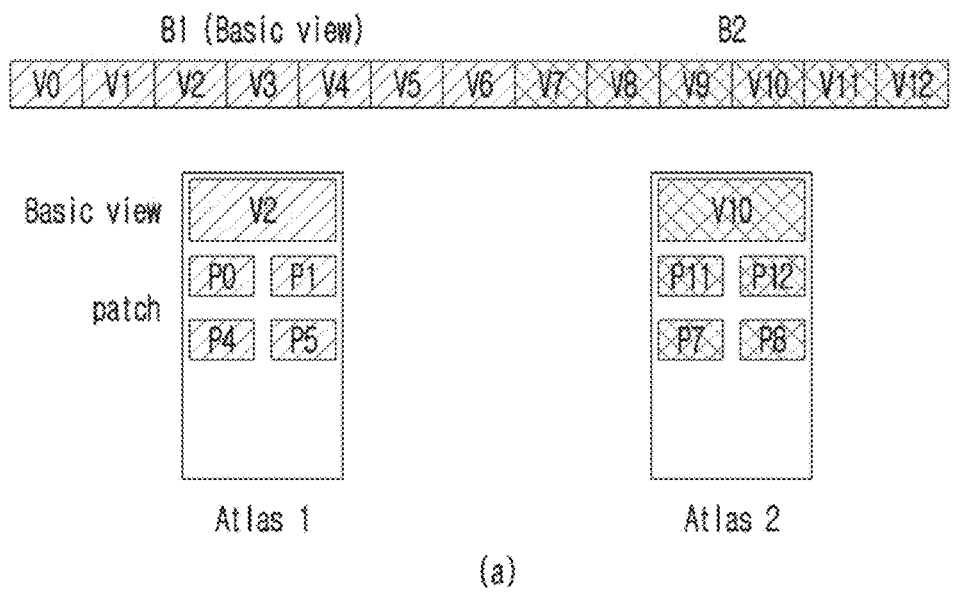
(a)
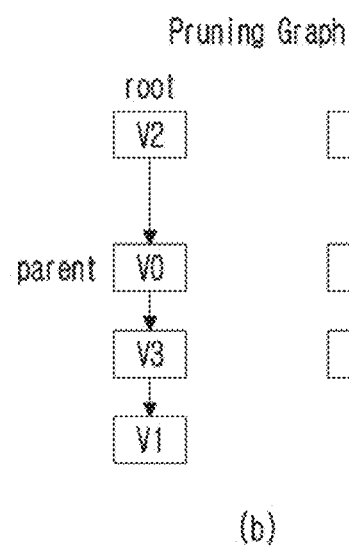
(b)

FIG. 19

```
pruning_parents( v ) {
    pp_is_root_flag[ v ]
    if ( pp_is_root_flag[ v ] == 0 ) {
        pp_num_parents_minus1[ v ]
        for ( i = 0; i <= pp_num_parents_minus1[ v ]; i++ )
            pp_parent_id[ v ][ i ]
    }
}
```

FIG. 20

```
caf_miv_extension( ) {
    ...
    came_update_pruning_parents_flag
    if (came_update_pruning_parents_flag)
    for( i = 0; i <= mvp_num_views_minus1; i++ ) {
        viewID = ViewIndexToId[ v ]
        pruning_parents (viewID )
    }

```
packed_independent_regions( ) {
    pir_num_packed_group_minus1
    for( i = 0; i <= pi_regions_count_minus1; i++ ) {
        pir_group_id[i]
        k=pir_group_id[i]
        pir_num_regions_minus1[ k ]
        pir_codec_type_idc[ k ]
        for( k = 0; i <= pir_num_regions_minus1; k++ ) {
            if( pir_codec_type_idc[ k ] == 0 ) {
                pir_top_left_tile_idx[ k ][ i ]
                pir_bottom_right_tile_idx[ k ][ i ]
            }
            else if( pir_codec_type_idc[ k ] == 1 ) {
                pir_subpic_id[ k ][ i ]
            }
        }
    }
}
```

METHOD FOR PROCESSING IMMERSIVE VIDEO AND METHOD FOR PRODUCING IMMERSIVE VIDEO

CROSS REFERENCE TO RELATED APPLICATION

The present application claims priority to Korean Patent Application Nos. 10-2020-0046127 filed Apr. 16, 2020, Korean Patent Application Nos. 10-2020-0048837 filed Apr. 22, 2020, Korean Patent Application Nos. 10-2020-0069280 filed Jun. 8, 2020, Korean Patent Application Nos. 10-2020-0076804 filed Jun. 23, 2020, Korean Patent Application Nos. 10-2020-0079153 filed Jun. 29, 2020, Korean Patent Application Nos. 10-2021-0049424 filed Apr. 15, 2021, the entire contents of which is incorporated herein for all purposes by this reference.

BACKGROUND OF THE INVENTION

1. Field of the Invention

The present disclosure relates to a method of processing and outputting an immersive video supporting motion parallax for rotation and translation.

2. Description of the Related Art

A virtual reality service is evolving in a direction for providing a service with a maximized sense of immersion and realism by generating an omnidirectional video in the form of a real image or computer graphics (CG) and reproducing the video on a head mounted display (HMD), a smartphone, etc. Currently, in order to reproduce a natural and immersive omnidirectional video through a HMD, six degrees of freedom (DoF) need to be supported. For a 6DoF image, a video free in six directions such as (1) left and right rotation, up and down rotation, (3) left and right movement and (4) up and down movement needs to be provided through a HMD screen. However, currently, most omnidirectional videos based on real images support only rotation. Therefore, research into acquisition and presentation of 6DoF omnidirectional videos is actively being conducted.

SUMMARY OF THE INVENTION

An object of the present disclosure is to provide a method of grouping view images into a plurality of groups.

In addition, another object of the present disclosure is to provide a method of reducing the amount of transmitted data through bitstream encoding/decoding for each group.

The technical problems solved by the present disclosure are not limited to the above technical problems and other technical problems which are not described herein will become apparent to those skilled in the art from the following description.

A method of producing an immersive video according to the present disclosure comprises decoding an atlas, determining whether the atlas is constructed by packing a plurality of sub-images, and producing a viewport image using the atlas. When the atlas is constructed by packing the plurality of sub-images, position information of each of the plurality of sub-images may be additionally parsed.

The method of producing the immersive video according to the present disclosure may further comprise parsing a flag indicating whether the viewport image is capable of being completely produced through the atlas. According to a value of the flag, when the viewport image is produced, it may be determined whether an additional atlas is used in addition to the atlas.

The method of producing the immersive video according to the present disclosure may further comprise decoding first mapping information between a spatial region and a view image. The first mapping information may comprise identifier information of a spatial region and identifier information of each of groups corresponding to the spatial region.

The method of producing the immersive video according to the present disclosure may further comprise decoding second mapping information between an atlas and a group. The second mapping information may comprise identification information of each of tiles in the atlas corresponding to a particular group.

The method of producing the immersive video according to the present disclosure may further comprise decoding quality information of a view image. The quality information may be a 1-bit flag indicating high quality or low quality.

In the method of producing the immersive video according to the present disclosure, the quality information may be decoded for each of a texture component and a depth component of the view image.

The method of producing the immersive video according to the present disclosure may further comprise decoding frame order information of atlases. The frame order information may comprise information on the number of atlases in an access unit and order information of the atlases.

The method of producing the immersive video according to the present disclosure may further comprise decoding pruning graph information of a view image. The pruning graph information may comprise at least one of a flag indicating whether the view image a root node or parent node information of the view image.

The method of producing the immersive video according to the present disclosure may further comprise decoding a flag indicating whether to update previously decoded pruning graph information for the view image.

The features briefly summarized above with respect to the present disclosure are merely exemplary aspects of the detailed description below of the present disclosure, and do not limit the scope of the present disclosure.

BRIEF DESCRIPTION OF THE DRAWINGS

The above and other objects, features and other advantages of the present disclosure will be more clearly understood from the following detailed description taken in conjunction with the accompanying drawings, in which:

FIG. 10 is a view illustrating a syntax structure including view image quality information;

FIG. 12 is a view illustrating an example of encoding order information of atlas frames;

FIG. 13 is a view illustrating an example of performing partial decoding for each group;

FIG. 14 is a view illustrating a viewport-dependent immersive video rendering method according to an embodiment of the present disclosure;

FIGS. 17 and 18 are views illustrating an example in which the number of atlases is less than the number of groups;

FIG. 19 is a view illustrating a syntax structure including information on a pruning graph;

FIG. 20 is a view illustrating a syntax structure including a syntax indicating whether information on a pruning graph is updated;

FIG. 22 is a view illustrating a syntax structure including region division information.

DESCRIPTION OF THE PREFERRED EMBODIMENTS

Figure 1:
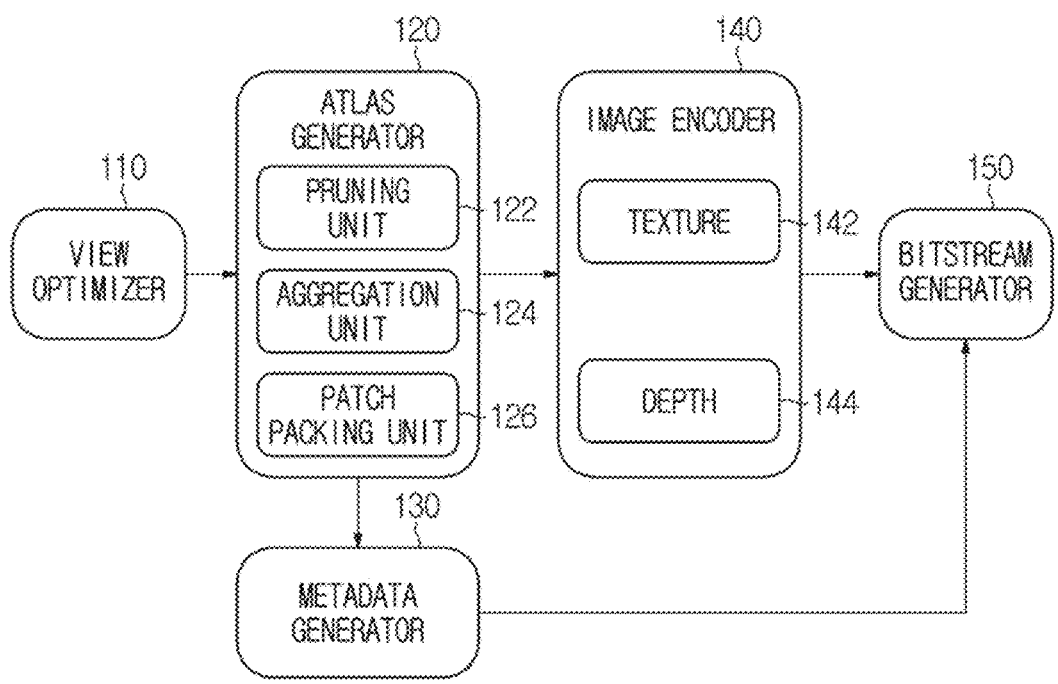
FIG. 1 is a block diagram of an immersive video processing apparatus according to an embodiment of the present disclosure.

A variety of modifications may be made to the present disclosure and there are various embodiments of the present disclosure, example, of which will now be provided with reference to drawings and described in detail. However, the present disclosure s not limited thereto, although the exemplary embodiments can be construed as including all modifications, equivalents, or substitutes in a technical concept and a technical scope of the present disclosure. The similar reference numerals refer to the same or similar functions in various aspects. In the drawings, the shapes and dimensions of elements may be exaggerated for clarity. In the following detailed description of the present disclosure, references are made to the accompanying drawings that show, by way of illustration, specific embodiments in which the disclosure may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present disclosure are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part one constitutional part may be divided into a plurality of constitutional parts to perform each function. The embodiment where each constitutional part is combined and the embodiment where one constitutional part is divided are also included in the scope of the present disclosure, if not departing from the essence of the present disclosure.

The terms used in the present specification are merely used to describe particular embodiments, and are not intended to limit the present disclosure. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present disclosure or the scope of the present disclosure.

In addition, some of constituents may not be indispensable constituents performing essential functions of the present disclosure but be selective constituents improving only performance thereof. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present disclosure. The same constituent elements in the drawings are denoted by the same reference numerals, and a repeated description of the same elements will be omitted.

An immersive video means an image whose viewport may be dynamically changed when a user's viewing position is changed. In order to implement an immersive video, a plurality of input images is required. Each of the plurality of input images may be referred to as a source image or a view image.

The immersive video may be classified as three degrees of freedom (3DoF), 3DoF+, Windowed-6DoF or 6DoF type. A 3DoF based immersive video may be implemented using only a texture image. In contrast, in order to render an immersive video including depth information, such as 3DoF+ or 6DoF, not only a texture image but also a depth image is required.

Assume that embodiments described below are for immersive video processing including depth information, such as 3DoF+ and/or 6DoF. In addition, assume that a view image is composed of a texture image and a depth image.

FIG. 1 is a block diagram of an immersive video processing apparatus according to an embodiment of the present disclosure.

Referring to FIG. 1, the immersive video processing apparatus according to the present disclosure may include a view optimizer 1110, an atlas generator 120, a metadata generator 130, an image encoder 140 and a bitstream generator 150.

The view optimizer 110 classifies view images into a basic image and an additional image. The basic image indicates a view image with highest pruning priority, which is not pruned, and the additional image indicates a view image with lower pruning priority than the basic image.

The view optimizer 110 may determine at least one of the view images as a basic image. View images which are not selected as the basic image may be classified as additional images.

The view optimizer 110 may determine the basic image in consideration of a view position of the view image. For example, a view image whose view position a center among the plurality of view images may be selected as a basic image.

Alternatively, the view optimizer 110 may select a basic image based on a camera parameter. Specifically, the view optimizer 110 may select a basic image based on at least one of a camera index, camera priority, a camera position or whether a camera is in a region of interest.

For example, at least one of a view image with a smallest camera index, a view image with a largest camera index, a view image with a camera index equal to a predefined value, a view image captured through a camera with highest priority, a view image captured by a camera with lowest priority, a view image captured through a camera at a predefined position (e.g., a center) or a view captured by a camera in a region of interest may be determined as a basic view image.

Alternatively, the view optimizer 110 may determine the basic image based on quality of the view images. For example, a view image with highest quality among the view images may be determined as a basic image.

Alternatively, the view optimizer 110 may determine a degree of data overlapping between the view images and then determine a basic image in consideration of an overlap data ratio with the other view images. For example, a view image with a highest overlap data ratio with the other view images or a view image with a lowest overlap data ratio with the other view images may be determined as a view image.

A plurality of view images may be set as a basic image.

The atlas generator 120 generates a pruning mask by performing pruning. In addition, a patch is extracted using the pruning mask and an atlas is generated by combining the basic image and/or the extracted patch.

The generated atlas may be composed of a texture atlas and a depth atlas. The texture atlas it an image in which a basic texture image and/or texture patches are combined, and the depth atlas indicates an image in which a basic depth image and/or depth patches are combined.

The atlas generator 120 may include a pruning unit 122, an aggregation unit 124 and a patch packing unit 126.

The pruning unit 122 performs pruning with respect to the additional image based on pruning priority. Specifically, pruning for the additional image may be performed using a reference image with higher pruning priority than the additional image.

The reference image includes a basic image. In addition, the reference image may further include another additional image according to the pruning priority of the additional image.

It may be selectively determined whether the additional information may be used as the reference image. For example, when the additional image is set not to be used as the reference image, only the basic image may be set as the reference image.

In contrast, when the additional image is set to be used as the reference image, the basic image and another additional image having higher pruning priority than the additional image may be set as the reference image.

Through the pruning process, overlapping data between the additional image and the reference image may be removed. Overlapping data detected from the additional image may be removed. As a result of performing pruning, a pruning mask that displays a non-overlapped region between the additional image and the reference image may be generated. The pruning mask may be binary data that displays data that does not overlap the reference image in the additional image. For example, on the pruning mask, a pixel determined as overlapping data may be marked as 0 and a pixel determined as non-overlapping data may be marked as 1.

Determination of overlapping data may be performed by comparing depth images. Specifically, the depth information at the corresponding positions of the additional depth image and the reference depth information is compared and, when a difference thereof is equal to or less than a threshold value, overlapping data between the additional depth image and the reference depth image at the corresponding position may be detected.

The non-overlapped region may have a shape other than a rectangular shape, but the patch is limited to a rectangular shape. Therefore, the patch may include not only a valid region but also an invalid region. Here, the valid region means a region composed of non-overlapping pixels between the additional image and the reference image. That is, the valid region represents a region including data which is included in the additional image but is not included in the reference image. The invalid region means a region composed of overlapping pixels between the additional image and the reference image. A pixel/data included in the valid region may be referred to as a valid pixel/valid data, and a pixel/data included in the invalid region may be referred to as an invalid pixel/invalid data.

The aggregation unit 124 extracts a patch using the pruning mask. Specifically, a rectangular region including valid data in the additional image may be extracted as a patch. Regardless of the shape of the valid region, a patch having a rectangular shape is extracted and the patch extracted from the valid region having a non-rectangular shape may include not only valid data but also invalid data.

The aggregation unit 124 may group at least one patch.

For an unpruned view image, an entire view image may be treated as a patch. Specifically, an entire 2D image in which the unpruned view image is deployed in a predetermined projection format may be set as a patch. The projection format may include at least one of an equirectangular projection format (ERP), a cube-map or a perspective projection format.

Here, the unpruned view image means a basic image with highest pruning priority. Alternatively, an additional image in which there is no overlapping data with the basic image and the reference image may be defined as an unpruned view image. Alternatively, regardless of whether there is overlapping data with the reference image, an additional image arbitrarily excluded from an object to be pruned may be defined as an unpruned view image. That is, even an additional image in which there is overlapping data with the reference image may be defined as an unpruned view image.

The packing unit 126 may pack each of grouped patches on a rectangular image. During packing, modification such as size change, rotation or flipping of the patch may be involved. An image packed with patches may be defined as an atlas.

Specifically, the packing unit 126 may generate a texture atlas by packing a basic texture image and/or texture patches and generate a depth atlas by packing a basic depth image and/or depth patches.

The entire basic image may be packed into an atlas image as a patch.

The number of atlases generated by the atlas generator 120 may be determined based on at least one of the arrangement structure of a camera rig, accuracy of a depth map or the number of view images.

The metadata generator 130 generates metadata for image production. The metadata may include at least one of camera related data, pruning related data, atlas related data or patch related data.

The pruning related data includes information for determining pruning priority of view images. For example, at least one of a flag indicating whether a view image is a root node or a flag indicating whether a view image is a leaf node may be encoded. The root node indicates a view image (i.e., a basic image) with highest pruning priority and the leaf node indicates a view image with lowest pruning priority.

When the view image is not a root node, a parent node index may be further encoded. The parent node index may represent the image index of a view image which is a parent node.

Alternatively, when the view image is not a leaf node, child node index may be further encoded. The child node index may represent the image index of a view image which is a child node.

The atlas related data may include at least one of information on the number of atlases, information on priority of atlases, flag indicating whether an atlas includes a complete image or scaling related information of an atlas.

The patch related data includes information for specifying the position and/or size of a patch in an atlas image, a view image, to which a patch belongs, and the position and/or size of a patch in a view image. For example, at least one of position information indicating the position of the patch in the atlas image or size information indicating the size of the patch in the atlas image may be encoded. In addition, a source index for identifying a view image, from which a patch is derived, may be encoded. The source index represents the index of a view image which is an original source of a patch. In addition, position information indicating a position corresponding to a patch in a view image or size information indicating a size corresponding to a patch in a view image may be encoded.

The image encoder 140 encodes the atlas. The image encoder 140 may include a texture image encoder 142 for encoding a texture atlas and a depth image encoder 144 for encoding a depth atlas.

The bitstream generator 150 generates a bitstream based on the encoded image data and meta data. The generated bitstream may be transmitted to an immersive video output apparatus.

Figure 2:
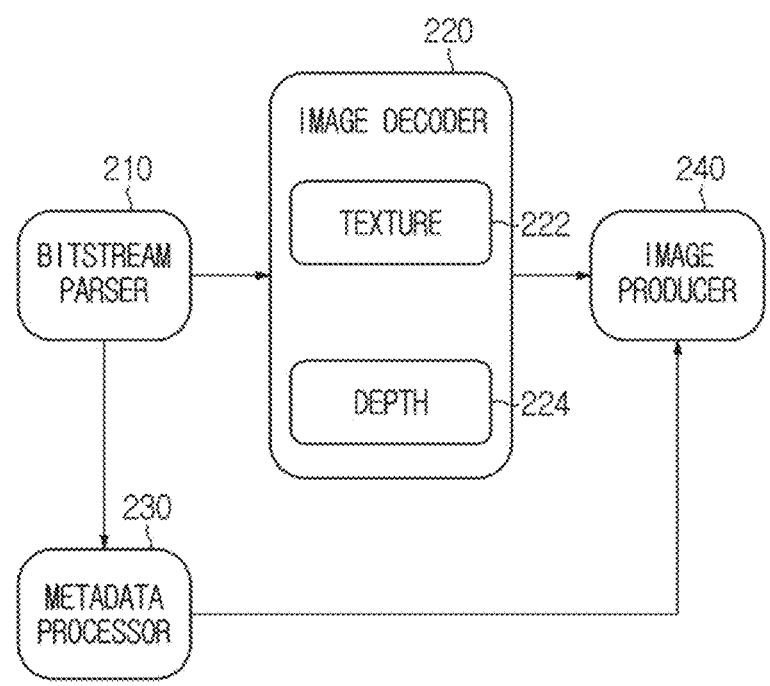
FIG. 2 is a block diagram of an immersive video output apparatus according to an embodiment of the present disclosure.

FIG. 2 is a block diagram of an immersive video output apparatus according to an embodiment of the present disclosure.

Referring to FIG. 2, the immersive video output apparatus according to the present disclosure may include a bitstream parser 210, an image decoder 220, a metadata processor 230 and an image producer 240.

The bitstream parser 210 parses image data and metadata from a bitstream. The image data may include data of an encoded atlas.

The image decoder 220 decodes the parsed image data. The image decoder 220 may include a texture image decoder 222 for decoding a texture atlas and a depth image decoder 224 for decoding a depth atlas.

The metadata processor 230 unformats the parsed metadata.

The unformatted metadata may be used to produce a particular view image. For example, when user's movement information is input to the immersive video output apparatus, the metadata processor 230 may determine an atlas necessary for image production, patches necessary for image production and/or the position/size of the patches in the atlas, in order to reproduce a viewport image according to user's movement.

The image producer 240 may dynamically produce the viewport image according to the user's movement. Specifically, the image producer 240 may extract patches necessary to produce the viewport image from the atlas, using information determined by the metadata processor 230 according to user's movement. Specifically, the viewport image may be produced by extracting an atlas including information on a view image necessary to produce the viewport image and patches extracted from the view image in the atlas and synthesizing the extracted patches.

Figure 3:
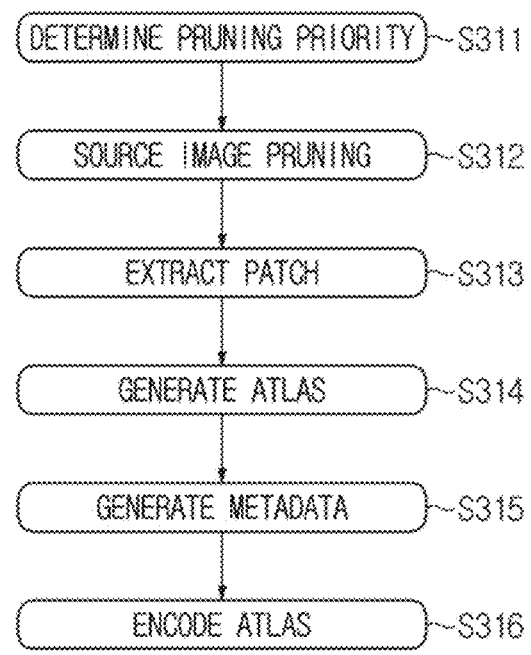
FIGS. 3 and 4 are flowcharts illustrating an immersive video processing method and an immersive video output method, respectively.
Figure 4:
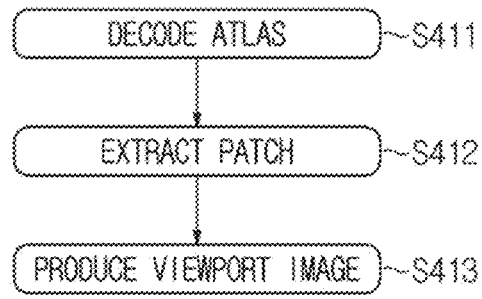

FIGS. 3 and 4 are flowcharts illustrating an immersive video processing method and an immersive video output method, respectively. An immersive video may be processed or output in order different from the order disclosed in FIGS. 3 and 4.

The immersive video processing apparatus may determine pruning priority of view images (S311). Specifically, the view images may be classified into a basic image and additional images and the pruning priority of the additional images may be set.

Thereafter, pruning is performed with respect to the view images based on the pruning priority (S312), and patches may be extracted using a pruning mask generated as a result of performing pruning (S313). An entire unpruned view image (e.g., a basic image) may be treated as a patch.

Thereafter, an atlas may be generated by combining the extracted patches (S314) and information on the generated atlas and information on patches included in the atlas may be generated as metadata (S315).

The atlas may be encoded (S316) and the metadata and the encoded atlas may be transmitted to the immersive video output apparatus.

The immersive video output apparatus may parse the bitstream received from the immersive video processing apparatus to extract atlas data and decode the atlas based on the extracted data (S411).

In addition, when user's movement occurs, an atlas required for viewport image production according to user's movement may be determined based on the metadata, and patches included in the atlas may be extracted (S412).

When the patches are extracted, the extracted patches may be synthesized to produce a viewport image (S413). In this case, size/position information of each patch and a camera parameter may be used to synthesize the generated patches.

Based on the above description, the video processing method proposed by the present disclosure will be described in greater detail.

In FIG. 1, the immersive video processing apparatus includes a single encoder. Unlike the shown example, the immersive video processing apparatus may be configured to include a plurality of encoders.

Each of the plurality of encoders may be referred to as a group encoder. Each group encoder may include at least one encoder. In addition, each group encoder may independently operate. That is, a plurality of atlases may be processed in parallel through the group encoder.

Figure 5:
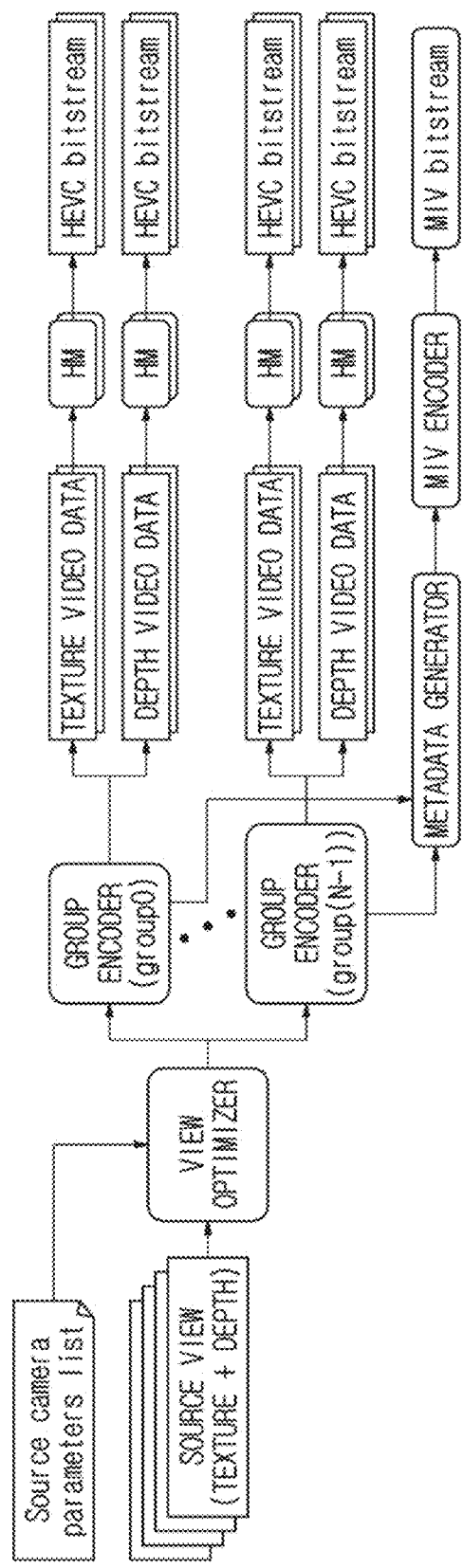
FIG. 5 is view illustrating an immersive video processing apparatus including a group encoder.

FIG. 5 is a view illustrating an immersive video processing apparatus including a group encoder.

When relevance in texture information or depth information between view images is small, efficient encoding/decoding is possible through a group encoder. Specifically, by classifying view images into a plurality of groups and then inputting the group images to each group encoder, it is possible to improve encoding/decoding efficiency.

Meanwhile, in a decoder, there is a need for a method capable of decoding only a partial image corresponding to a particular space among all spatial regions when a viewer wants to views a video obtained by shooting an omnidirectional space.

For this, the present disclosure provides a method of grouping a plurality of view images configuring an omnidirectional spatial image into a plurality of groups and encoding/decoding and/or rendering an image for each group.

Grouping of view images may be performed based on spatial continuity between the view images or spatial proximity between the view images. Alternatively, view images corresponding to an arbitrary spatial region may be set as a group.

For example, N spatially continuous view images may be set as a group. Alternatively, view images included in a particular spatial region may be set as a group. Alternatively, after an entire space is divided into a plurality of spatial regions based on a distance and/or an angle, grouping of view images may be performed for each spatial region.

Figure 6:
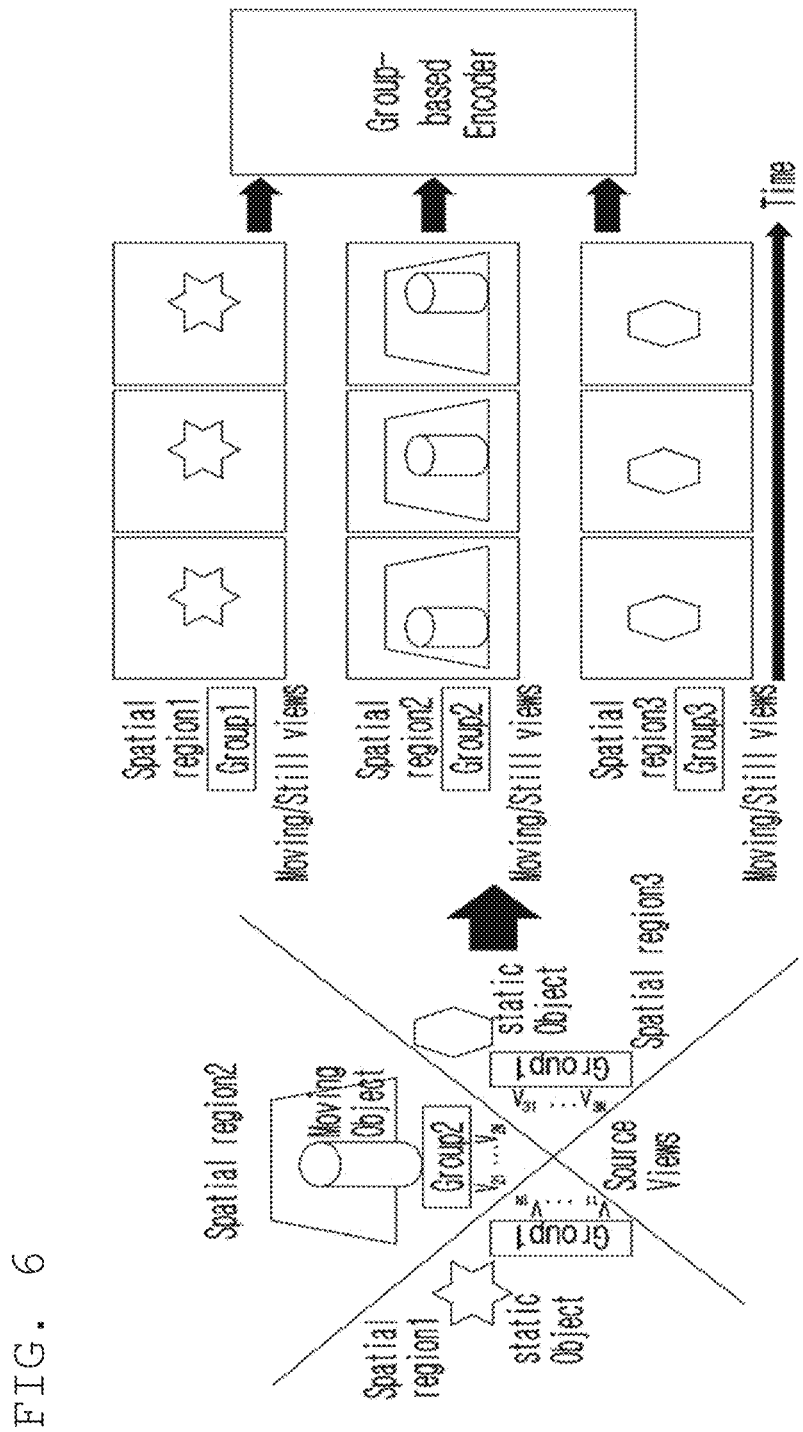
FIG. 6 is a view illustrating an example of grouping a plurality of view images.

FIG. 6 is a view illustrating an example of grouping a plurality of view images.

In FIG. 6, view images configuring a particular spatial region may be classified as one group.

For example, as shown in FIG. 6, view images V11 . . . V1N obtained by shooting spatial region 1 may be classified as group1 and view images V21 . . . V2N obtained by shooting spatial region 2 may be classified as group2. In addition, view images V31 . . . V3N obtained by shooting spatial region 3 may be classified as group3.

View images may be grouped in consideration of an object of interest. For example, view images obtained by shooting the object of interest may be classified as a group. Alternatively, view images including information on the object of interest may be classified as a group, and view images which does not include information on the object of interest may be classified as a group.

When there is a plurality of objects of interest, a group may be generated for each of the objects of interest. In this case, when one view image includes a plurality of objects of interest, grouping of view images may be performed in consideration of priority of the objects of interest. For example, when one view image includes a plurality of objects of interest, the view images may be classified as a group corresponding to an object of interest with highest priority among the plurality of objects of interest.

Information indicating whether an object of interest is included in a source image or an atlas image or information indicating priority of objects of interest may be encoded as metadata. For example, a source image including an object of interest and a source image which does not include an object of interest may be grouped as separate groups.

A bitstream may be independently generated for each group. For example, groups may be input to different group encoders and processed in parallel. Here, an image input to the encoder may be an atlas corresponding to a group. Here, the atlas corresponding to the group may be generated using only view images belonging to the group.

Alternatively, the groups may be sequentially input to the group encoder and image encoding may be set to reference only groups, to which the corresponding image belongs.

When a plurality of bitstreams, for example, bitstreams of groups, are generated, the plurality of generated bitstreams may be multiplexed and then transmitted to the decoder.

As another example, a 360-degree omnidirectional space may be divided into a space where an object with more movement appears and a space where an object with less movement appears, thereby grouping view images.

Figure 7:
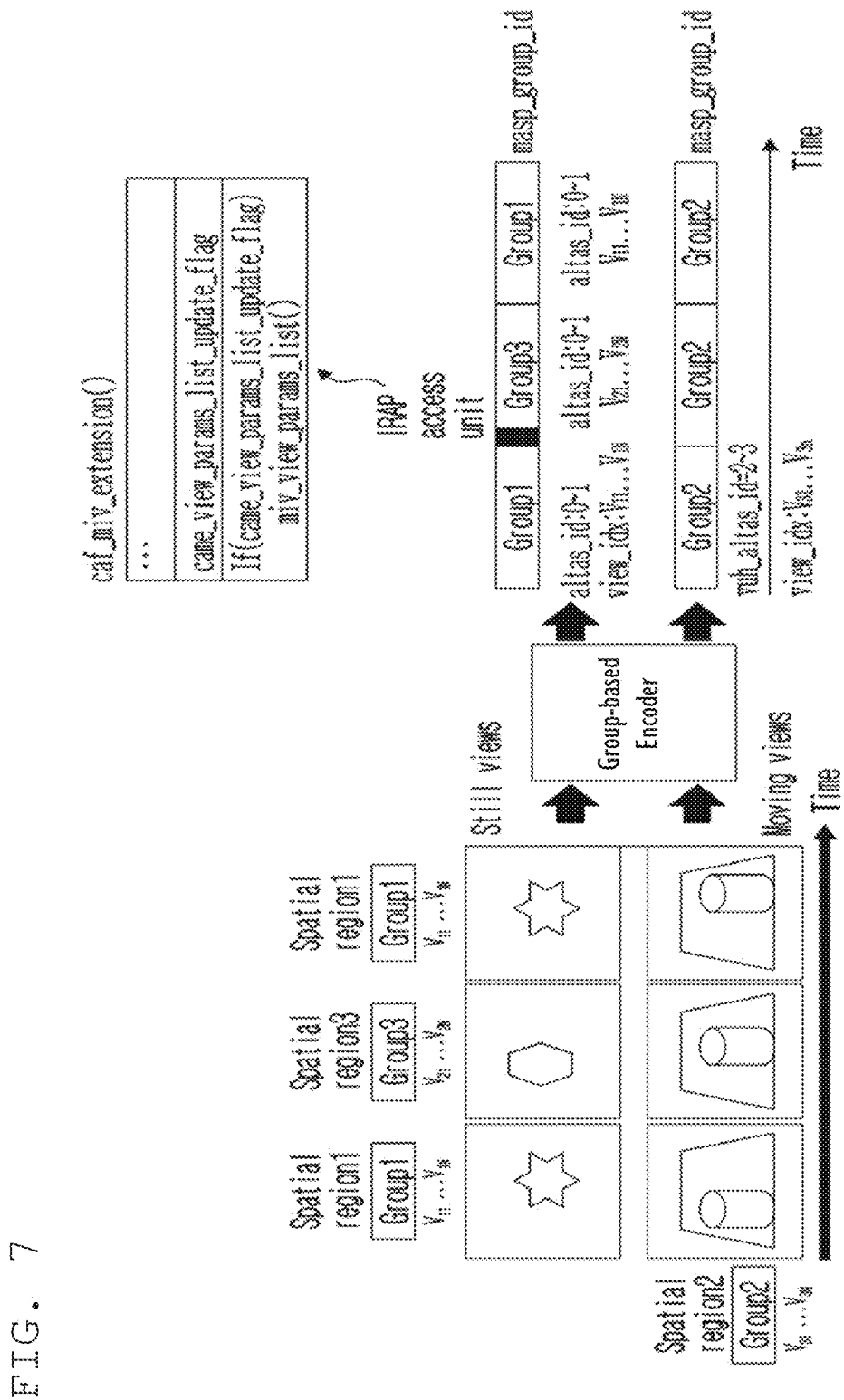
FIG. 7 is a view illustrating space division according to motion of an object and a method of grouping view images through the same.

FIG. 7 is a view illustrating space division according to motion of an object and a method of grouping view images through the same.

In the shown example, spatial region 1 and spatial region 3 represent spaces where objects with less movement appear and spatial region 2 represent at space where objects with more movement appear. Spatial region 1 and spatial region 3 are regions of non-interest including objects with less movement and group1 and group3 may be respectively generated for the spatial regions. Spatial region 1 and spatial region 3 are spaces where objects with less movement appear and thus view images included in the groups may be mostly processed like a still image. Here, being processed like a still image may mean that a representative frame or only frames for each predetermined unit interval may encoded/decoded instead of encoding/decoding all frames in an access unit.

Spatial region 2 is a region of interest including objects with more movement and group2 may be generated for spatial region 2. In this case, spatial region 2 is mainly composed of objects with more movement and thus view images included in the group may be processed like a moving image. Here, being processed like the moving image may mean that all frames in an access unit need to be encoded/decoded.

In the embodiments described with reference to FIGS. 6 and 7, one spatial region is mapped to one group. Unlike the shown example, a plurality of groups may be generated for one spatial region or one group may be generated for a plurality of spatial regions.

A group corresponding to a region of interest and a group corresponding to a region of non-interest may be encoded by different encoders.

In this case, groups corresponding to a region of non-interest may be encoded through an integrated group encoder, that is, one group encoder. For example, images corresponding to group1 and group3 may be encoded through a single group encoder.

When a plurality of groups is encoded using one encoder, encoded bitstreams may be multiplexed in video frame units of a specific period (e.g., intra period units). When multiplexing is performed in video frame units of a specific period, a sequence generated by at least one atlas generator may be switched and multiplexed through one video encoder (a video texture encoder and a video depth encoder).

Alternatively, groups corresponding to a region of non-interest may be encoded by different encoders. For example, group1 and group3 may be encoded through separate encoders. Thereafter, bitstreams output by the encoders may be multiplexed.

The bitstream encoded through the encoder may include information for enabling a user to directly access an arbitrarily spatial region (that is, a spatial random access). The information may include metadata information of at least one of a view image identifier view_idx, an atlas identifier altas_id, a group identifier msap_group_id or whether it is a region-of-interest group. The information may be encoded in intra period access units (that is, IRAP access units).

In FIG. 7, a common atlas frame MIV extension( ) structure (caf_miv_extension( )) includes additional information on an atlas and/or a view image.

A syntax came_view_params_list_update_flag indicating whether view related information in the atlas is updated may be added to the above structure. The value of the flag came_view_params_list_update_flag being true (that is, 1) indicates that the view related information in the atlas is updated over time. In this case, the atlas configuration information may be updated by referencing the miv_view_params_list( ) structure.

The atlas configuration information may be updated with respect to at least one of the size of the atlas image, configuration of the view images included in the atlas (e.g., the number of view images or whether a particular view image is included), grouping information of the view images included in the atlas or whether a view image is a basic image.

The atlas may be divided into a plurality of tiles or a plurality of tile groups.

Figures 8, 9:
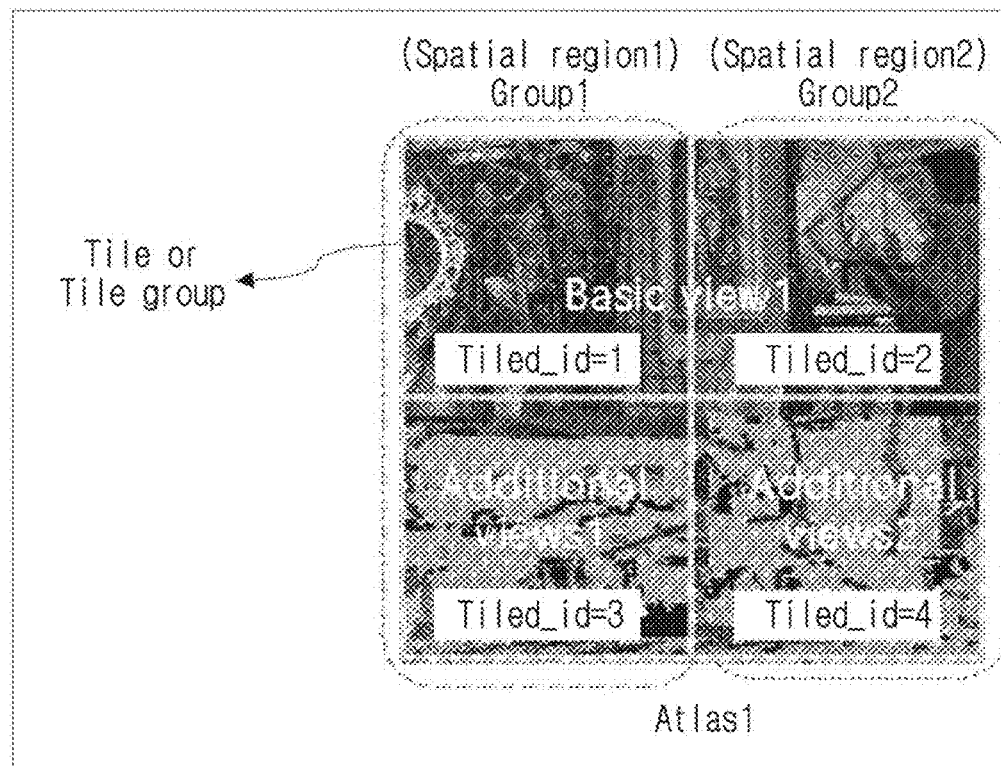
FIG. 8 is a view illustrating an example in which an atlas is divided into a plurality of tiles or a plurality of tile groups.
FIG. 9 is a view illustrating an example of encoding information specifying a group corresponding to each space.

FIG. 8 is a view illustrating an example in which an atlas is divided into a plurality of tiles or a plurality of tile groups.

The atlas may include information on at least one of a basic image or an additional image. The atlas including information on at least one of the basic image or the additional image may be divided into a plurality of tiles or a plurality of tile groups.

In FIG. 8, each of a region corresponding to a basic image included in an atlas and a region corresponding to an additional image is divided into two tiles or tile groups.

After the atlas is divided into a plurality of tiles or tile groups, encoding/decoding may be independently performed for each tile or tile group. For example, the tiles or tile groups may be input to different encoders, thereby generating a bitstream for each tile or tile group. Therefore, in the decoder, access is possible only for a particular tile or a particular tile group in an atlas. For example, as in the example shown in FIG. 8, by dividing the atlas into a plurality of tiles or tile groups, a viewer can access a spatial region of a narrower range.

Alternatively, by dividing an atlas into a plurality of tiles or tile groups, it is possible to specify a region to be referenced for occlusion region interpolation during producing the view image in the decoder, in another atlas.

Address information of each tile or tile group in the atlas may be encoded and signaled. For example, in order to distinguish the tiles or tile groups in the atlas, an indicator atgh_address may be encoded and signaled.

When view images are classified into a plurality of groups, additional information specifying a group mapped to each view image may be encoded. For example, when view images are grouped after an omnidirectional space is divided into a plurality of spaces, spatial identification information identifying each of a plurality of spaces and mapping information specifying a group corresponding to each space may be encoded.

FIG. 9 is a view illustrating an example of encoding information specifying a group corresponding to each space.

After an omnidirectional space is divided into at least one spatial region, different spatial region identifiers may be assigned to the spatial regions. For example, a syntax si_spatial_region_id[i] represents an identifier assigned to a region with an index 1.

At least one group may be mapped to one spatial region. When a plurality of groups is mapped to one spatial region, information indicating an identifier assigned to each group may be encoded. For example, a syntax si_group_id[i][j] represents as identifier assigned to a group with as index j is a region with an index i.

When an atlas is divided into a plurality of a plurality of tiles or tile groups, mapping information between the spatial region or group and the tile or tile group may be additionally encoded. For example, a syntax si_tile_id[j][k] represents an identifier assigned to a tile with an index k in a group with an index j.

As in the above-described example, identification information may be hierarchically encoded in order of a spatial region identifier, a group identifier and a tile/tile group identifier. That is, according to the above syntax structure, mapping relationships are sequentially defined from, a higher layer to a lower layer. Therefore, in the decoder, accessibility to a spatial region desired by the user may be improved.

Meanwhile, in order to define a spatial region identifier si_spatial_region_id, spatial region information may be separately defined using a world coordinate system.

In the above-described example, encoding is hierarchically performed in order of the spatial region identifier, the group identifier and the tile/tile group identifier. However, although at least one layer is deleted is the above hierarchical structure, a structure in which an arbitrary layer is added to the above hierarchical structure may also be included in the scope of the present disclosure.

In order to capture an omnidirectional image, cameras need to be disposed with a wide width. To this end, consistency of color and depth information between view images may be lowered. In addition, in an immersive video presentation apparatus, when a single patch covers a wide region during specific view rendering, the quality of a rendered viewport images may deteriorate.

Therefore, the present disclosure proposes a pruning method based on the quality of the view images.

FIG. 10 is a view illustrating a syntax structure including view image quality information.

In order to perform pruning based on the quality of the view images, quality information of the view images (e.g., a difference in color/depth between the view images, depth quality, etc.) may be additionally encoded as pruning parameter.

Here, the quality information may be encoded and signaled for each view image. For example, quality information may be signaled in each view image or only for a basic image or an additional image.

In this case, instead of digitizing the quality of the view images and encoding quality information, quality information may be encoded into a 1-bit value capable of determining whether quality is good or bad. Therefore, it is possible to reduce the amount of bits necessary to encode the quality information.

(a) of FIG. 10 shows an example of signaling quality information for each of all view images. When viewId of each view image is determined, a first flag (e.g., color_depth_quality_flag1[viewId]) may be signaled for each viewId. The first flag may be encoded through a Mdv_view_params_list( ) structure.

(b) of FIG. 10 shows an example of signaling quality information for at least one of a basic image or an additional image. At least one of a second flag (e.g., color_depth_quality_flag2[viewId]) indicating the quality of the basic image or a third flag (e.g., color_depth_quality_flag3[viewId]) indicating the quality of the additional image may be encoded and signaled. The second flag or the third flag may be encoded and signaled through a pruning parents structure.

The type of the encoded Quality information may be determined depending on whether the view image is a basic image. For example, in (b) of FIG. 10, a syntax pp_is_root_flag[viewId] indicates whether a view image with an identifier of viewId is a root image (that is, a basic image). The value of the flag pp_is_root_flag[viewId] being 1 indicates that the view image is a basic image. In this case, the quality information (that is, the second flag) of the basic image may be encoded and signaled. In contrast, the value of the flag pp_is_root_flag[viewId] being 0 indicates that the view image is an additional image. In this case, the quality information (that is, the third flag) of the additional image may be encoded and signaled.

Unlike the example shown in (b) of FIG. 10, encoding of the quality information (that is, the third flag) of the additional view may be omitted and the quality of the additional view may be set equal to the quality of the basic view image. For example, a flag color_depth_quaility_flag2[viewId] may represent a representative value of the quality of the basic view with an identifier of viewId and the additional views belonging to the same group as the basic view (that is, additional views connected to the same pruning graph as the basic view).

Quality information of a texture component and quality information of a depth information may be encoded and signaled, respectively. For example, color_quality_flag representing the quality information of the texture component and depth_quality_flag representing the quality information of the depth component may be encoded and signaled, respectively.

Alternatively, a flag indicating whether the quality information of the depth component is individually signaled may be encoded and signaled. When the quality information of the depth information is not individually signaled, the quality of the depth information may be set equal to the quality of the color component.

As another example, quality information is encoded in 2 bits: one bit may be set to indicate the quality of the texture component and the other bit may be set to indicate the quality of the depth information.

Information indicating the type of the quality information may be additionally encoded. For example, the quality information type may indicate at least one of whether the encoded quality information is commonly applied to all view images, a basic view or an additional image, whether to represent the quality of the texture image, or whether to represent the quality of the depth image.

Based on the quality information, when rendering a viewport image, it is possible to select whether a branch and a branch are blended or merged, after view images connected with a branch in a pruning graph are first blended.

Figure 11:
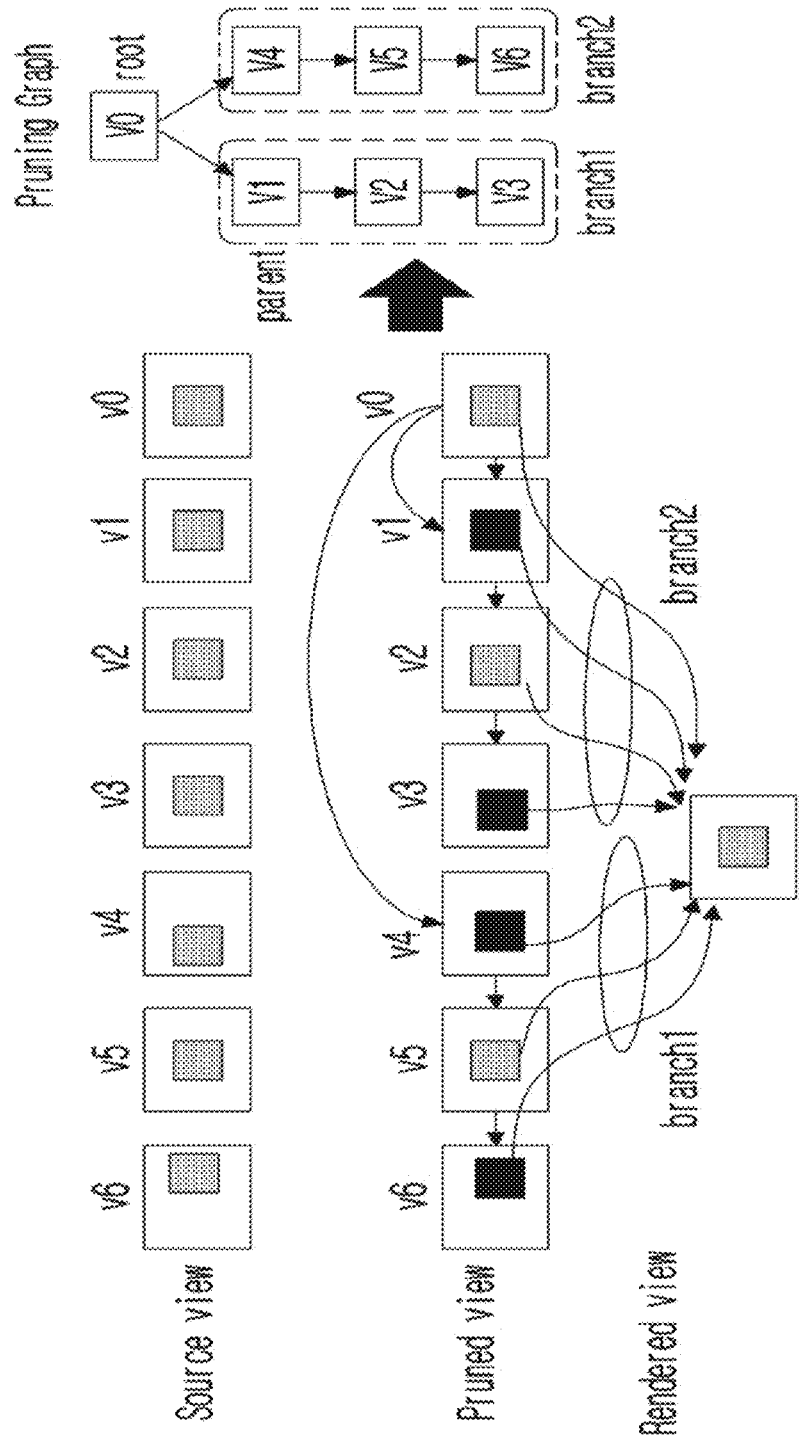
FIG. 11 is a view illustrating an example of selectively performing blending or merging during image production.

FIG. 11 is a view illustrating an example of selectively performing blending or merging during image production.

In FIG. 11, a view image v0 is a basic image (that is, root image), a first branch 1 is branched to the left of the view image v0 and a second branch 2 is branched to the right. In addition, the first branch may be defined in order of a view image v1, a view image v2 and a view image v3, and the second branch is defined in order of a view image v4, a view image v5 and a view image v6.

During image production, view images belonging to each branch are projected to a viewing position of a user and then image processing may be applied to the projected view images. Here, image processing may be blending of view images or selection of one of view images. Blending the view images may be defined as blending process and selecting one of the view images may be defined as a merging process.

Based on the quality information, it is possible to determine whether to apply the blending process or the merging process. For example, the blending process is applicable when the quality information of the view images are the same, and the merging process is applicable when the quality information of the view images is different. When the merging process is applied, an image may be produced using view images with high quality information among the view images.

Alternatively, the blending process is applied and a weight given to each view image may be determined based on the quality information. For example, a weight given to a view image with high quality information may be set higher than a weight given to a view image with low quality information.

When bit streams are multiplexed in video frame units of a specific period, order information of frames need to be defined in the decoder. In the decoder, order information of the frames may be decoded and then a decoding order or a presentation order may be determined.

FIG. 12 is a view illustrating an example of encoding order information of atlas frames.

The order of atlas frames may be not only used to determine a decoding order of atlas frames in an access unit or a presentation order of atlas frames, but also be used to synchronize the atlas frames.

In the shown example, a frame_count( ) structure defines metadata related to the order information of the atlas frames.

A syntax fc_num_frame represents the number of atlas frames in a video frame period (e.g., an intra frame period). That is, a syntax fc_num_frame represents the total number of atlas frames in an access unit.

A syntax fc_count(i) represents the order of an atlas frame with an index of i. The value of the syntax fc_count increases every frame with a specific period according to the order of the atlas frames.

Meanwhile, a frame_count( ) structure may be included in an atlas_frame_parameter_set_rbsp( ) structure defining the additional information of an atlas frame, and may be transmitted separately from the atlas_frame_parameter_set_rbsp( ).

In consideration of system complexity, the view images may be classified into a plurality of groups and then one atlas may be generated for each group.

However, as described above, when the number of atlases for each group is forced to be 1, the number of basic views may decrease and thus rendering quality may deteriorate.

FIG. 13 is a view illustrating an example of performing partial decoding for each group.

In the encoder, after view images are classified into a plurality of groups, an atlas may be generated for each group. In addition, the atlas may be generated for each group and the generated bitstreams may be multiplexed and transmitted.

An edge server may receive viewport image of a user from an immersive video presentation apparatus and filter only an atlas or an atlas group corresponding to a viewport based on a user viewport.

The immersive video presentation apparatus may receive and decode only a filtered bitstream, instead of all bitstreams. For example, as shown in FIG. 13, when a viewport is near a view image v6, the immersive video presentation apparatus may decode only a bitstream of an atlas of a group, to which a view image v6 belongs (that is, partial bitstream).

However, when only one atlas is decoded, the other atlases may not be referenced. Therefore, when arbitrary view images are produced, incomplete rendering in which an occlusion region is not completely filled may be performed.

The present disclosure proposes various methods for solving the above problems.

FIG. 14 is a view illustrating a viewport-dependent immersive video rendering method according to an embodiment of the present disclosure.

An encoder may transmit a bitstream compressed with high quality (hereinafter referred to as a high-quality bitstream) and a bitstream compressed with low quality (hereinafter referred to as a low-quality bitstream), for each group.

A low-quality image may be generated by decreasing the resolution of an original image or decreasing the compression rate of an original image.

When viewport information is received from the immersive video presentation apparatus, a server may determine whether to transmit a high-quality bitstream or a low-quality bitstream for each group based on the received viewport information.

For example, a high-quality bitstream may be selected and transmitted for a group corresponding to the viewport of the user and a low-quality bitstream may be selected and transmitted for the other groups.

The immersive video presentation apparatus may produce an image based on the received bitstreams. Since a high-quality bitstream is selected and transmitted for a group corresponding to the viewport of the user and a low-quality bitstream is selected and transmitted for the other groups, during image production, viewport image rendering, in which a main scene is produced with high quality and an occlusion region is interpolated with low quality, may be performed.

When grouping view images, view images near a boundary between spatial images may be interleaved and organized or one view image may be overlapped and organized in a plurality of groups.

Figures 15, 16:
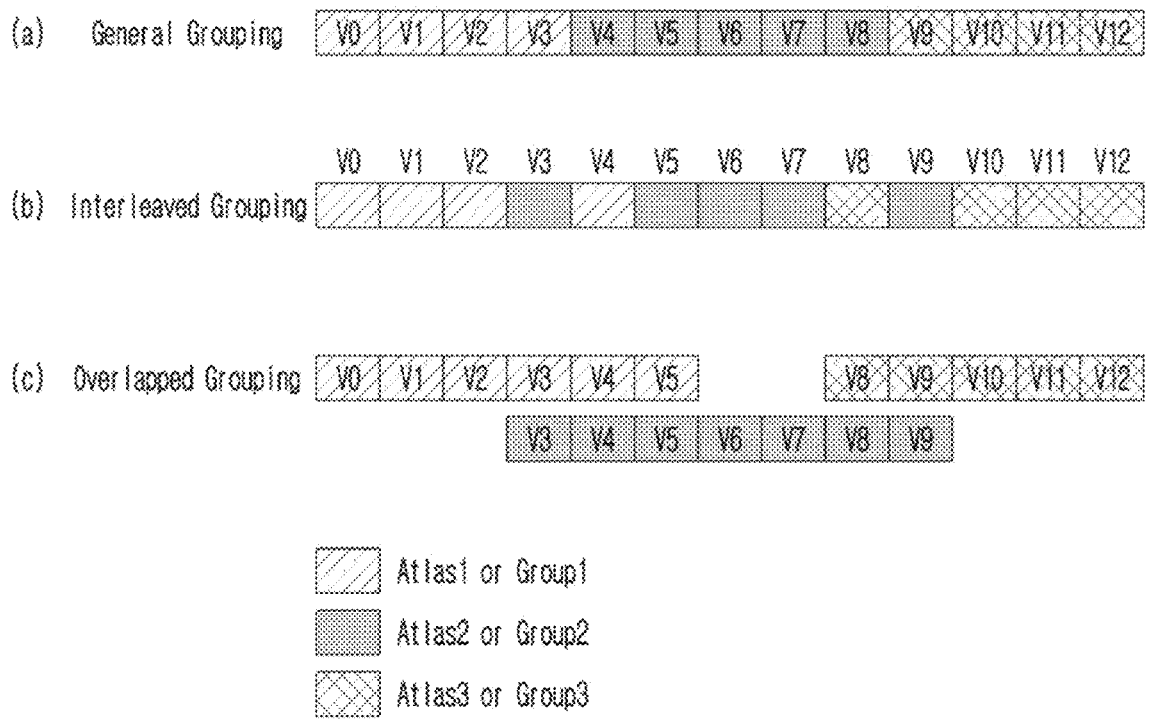
FIG. 15 is a view illustrating a method of grouping view images.
FIG. 16 is a view illustrating a syntax structure including information indicating whether a patch is derived from an overlapped view image.

FIG. 15 is a view illustrating a method of grouping view images.

(a) of FIG. 15 shows an example of grouping view images for each spatial region.

In the example of (a) of FIG. 15, a view image v0 to a view image v3 are included in a first spatial region. In addition, a view image v4 to a view image v8 are included in a second spatial region. In addition, a view image v9 to a view image v12 are included in a third spatial region.

(b) of FIG. 15 shows an interleaved grouping method.

When the interleaved grouping method is applied, groups may be organized by interleaving view images located at a boundary portion between spatial regions. For example, in the example of (b) of FIG. 15, groups may be organized by interleaving the view image v3 and the view image v4 located at a boundary between the first spatial region and the second spatial region. That is, the view image v3 may be organized in a second group instead of a first group and the view image v4 may be organized in the first group instead of the second group.

Likewise, groups may be organized by interleaving a view image v8 and a views image v9 located at a boundary between the second spatial region and the third spatial region. For example, the view image v8 may be organized in a third group instead of the second group and the view image v9 may be organized in the second group instead of the third group.

(c) of FIG. 15 shows an overlapped grouping method.

When the overlapped grouping method is applied, a view image located at a boundary portion between spatial regions may be overlapped and organized in a plurality of groups. For example, in the example shown (c) of FIG. 15, a view image v3, a view image v4 and a view image v5 adjacent to a boundary between a first spatial region and a second spatial region may be all organized in a first group and a second group.

Likewise, a view image v8 and a view image adjacent to a boundary between a second spatial region and a third region may be all organized in a second group and a third group.

When the overlapped grouping method is applied, in order to minimize an increase in the amount of encoding data, a view image overlapped in a plurality of groups may be set to lowest priority (that is, a leaf node) on the pruning graph. By setting the overlapped view image as a leaf node, it is possible to reduce the number and amount of patches extracted from the overlapped view image.

Alternatively, at least one of the size, quality or resolution of a patch extracted from the overlapped view image may be reduced and then the reduced patch may be packed in an atlas. This is because the overlapped view image is mainly used to interpolate an occlusion region and thus the effect on overall rendering quality is insignificant even if the overlapped view image is reconstructed with low quality in a decoder.

When a bitstream is divisionally decoded for each group, information indicating whether a viewport image is capable of being completely produced from the divisionally decoded bitstream may be encoded as metadata. For example, a flag renderable_atlas(group)_flag may be encoded. The value of the flag being 1 indicates that a viewport image is capable of being completely produced through a single atlas. In contrast, the value of the flag being 0 indicates that a viewport image is incapable of being completely produced through a singles atlas.

The flag may be encoded for each group (that is, for each atlas). For example, renderable_atlas(group)_flag[i] indicates setting of a group with an index of i (or an atlas with an index of i).

In order to completely produce a viewport image with only a single atlas, the atlas includes a basic image and the atlas is composed of views capable of completely interpolating an occlusion region. Therefore, the immersive video processing apparatus may set the value of the flag renderable_atlas(group)_flag to true or false, based on at least one of whether the atlas includes a basic image or whether the atlas is composed of view images capable of completely interpolating an occlusion region.

For example, when the atlas is composed of view images capable of completely interpolating the occlusion region or includes a basic, view, the value of the flag renderable_atlas(group)_flag may be set to true. In contrast, when the atlas is not composed of view images capable of completely interpolating the occlusion region or does not include a basic view, the value of the flag renderable_atlas(group)_flag may be set to false.

Alternatively, the value of the flag renderable_atlas(group)_flag may be set according to the method or grouping view images. For example, when a general grouping method (e.g., (a) of FIG. 15) is applied, the value of the flag renderable_atlas(group)_flag may be set to false. In contrast, when interleaving grouping (e.g., (b) of FIG. 15) or overlapped grouping (e.g., (c) of FIG. 15) is applied, the value of the flag renderable_atlas(group)_flag may be set to true.

Based on the value of the flag renderable_atlas(group)_flag, whether decoding/rendering of only a partial bitstream is allowed may be determined. For example, when the value of the flag renderable_atlas(group)_flag is true, the decoder may partially decode/render the atlas. Alternatively, when the value of the flag renderable_atlas(group)_flag is true, the edge server may perform filtering such that the atlas is partially transmitted.

When the flap renderable_atlas(group)_flag is true, information on a view image capable of being completely rendered through the atlas may be additionally encoded. For example, the information may include at least one of the number of view images capable of being completely rendered or identifiers of the view images capable of being completely rendered.

When the flag renderable_atlas(group)_flag is false, information on an atlas (or a group) additionally required to completely render a particular view image may be additionally encoded. For example, the information may include at least one of the number of additional atlases or identifiers of the additional atlases. The decoder may additionally decode at least one atlas indicated by the information and produce a viewport image.

The flag renderable_atlas(group)_flag may be encoded as metadata of an immersive video and then transmitted to the immersive video presentation apparatus. The immersive video presentation apparatus may perform functions such as spatial random access, viewport dependent rendering or divisional decoding/rendering using the above flag.

The flag renderable_atlas(group)_flag may be included in an atlas sequence parameter set, a MIV extension Common atlas sequence parameter set or a common atlas frame MIV extension, etc. The above structures may include information related to an atlas and a view image.

When an atlas is generated based on view images with low geometric information quality, rendering quality may deteriorate even in the immersive video presentation apparatus. When the quality of the view images is low, it may be more advantageous to improve rendering quality, by constructing an atlas with only unpruned view images (that is, basic view images).

Accordingly, in the immersive video processing apparatus, it is possible to determine whether to construct an atlas with only basic images, in consideration of the quality of the view images. In addition, metadata indicating whether the atlas is composed of only basic images may be encoded and signaled. For example, a flag basic_view_only_flag may be encoded and signaled. The value of the flag basic_view_only_flag being 1 indicates that the atlas is composed of only basic image(s). In contrast, when the value of the flag basic_view_only_flag being 0 indicates that the atlas is composed of a basic image and an additional image (that is, a pruned view image).

In the above-described example, when the overlapped grouping method is applied, at least one of the size, quality or resolution of the patch extracted from the view images overlapped in the plurality of groups may be reduced. That is, the patch extracted from the view image overlapped in the plurality of groups (hereinafter referred to as an overlapped view image) has characteristics different from those of a patch extracted from a view image organized in a single group (hereinafter referred to as a single view image).

Therefore, metadata indicating whether a patch in an atlas extracted from an overlapped view image may be encoded and signaled.

FIG. 16 is a view illustrating a syntax structure including information indicating whether a patch is derived from an overlapped view image.

A flag pdu_overlap_flag indicates whether a patch is derived from an overlapped view image.

When flag pdu_overlap_flag[p] is true, this indicates that a patch with an index of p is derived from an overlapped view image. In contrast, when the flag pdu_overlap_flag[p] is false, this indicates that a patch with an index of p is not derived from an overlapped view image.

As described above, a patch derived from an overlapped view image has reduced size, quality or resolution as compared to a patch which is not derived from an overlapped view image. Therefore, it is possible to more improve rendering quality by preferentially using a patch derived from a single view image over a patch derived from an overlapped view image. That is, when a plurality of patches is obtained from the same spatial region, a patch in which a flag pdu_overlap_flag is true may be processed with lower priority than a patch in which pdu_overlap_flag is false. The priority may be used to give a weight to each view image during a blending process or may be used to determine which of a plurality of view images is selected during a merging process. For example, during the blending process, a weight given to a view image with high priority may be set higher than a weight given to a view image with low priority. For example, during the merging process, a view image with highest priority may be selected from among view images.

Meanwhile, when at least one of the size, quality or resolution of the patch is reduced, information indicating a reduction ratio may be encoded through patch_data_unit( ) which is a higher structure of pdu_miv_extention( ).

In the embodiments shown in FIGS. 14 and 15, view images are grouped into a plurality of groups and then one atlas is generated for each group.

In immersive video in a wide spatial region, since correlation between view images is different and thus consistency is low, it is possible to improve rendering quality, by increasing the number of groups, into which view images with high correlation of geometric information and high consistency are grouped.

However, in order to simplify a transmission/reception system, instead of generating an atlas for each group, atlases less in number than the number of groups may be generated.

Figure 18:
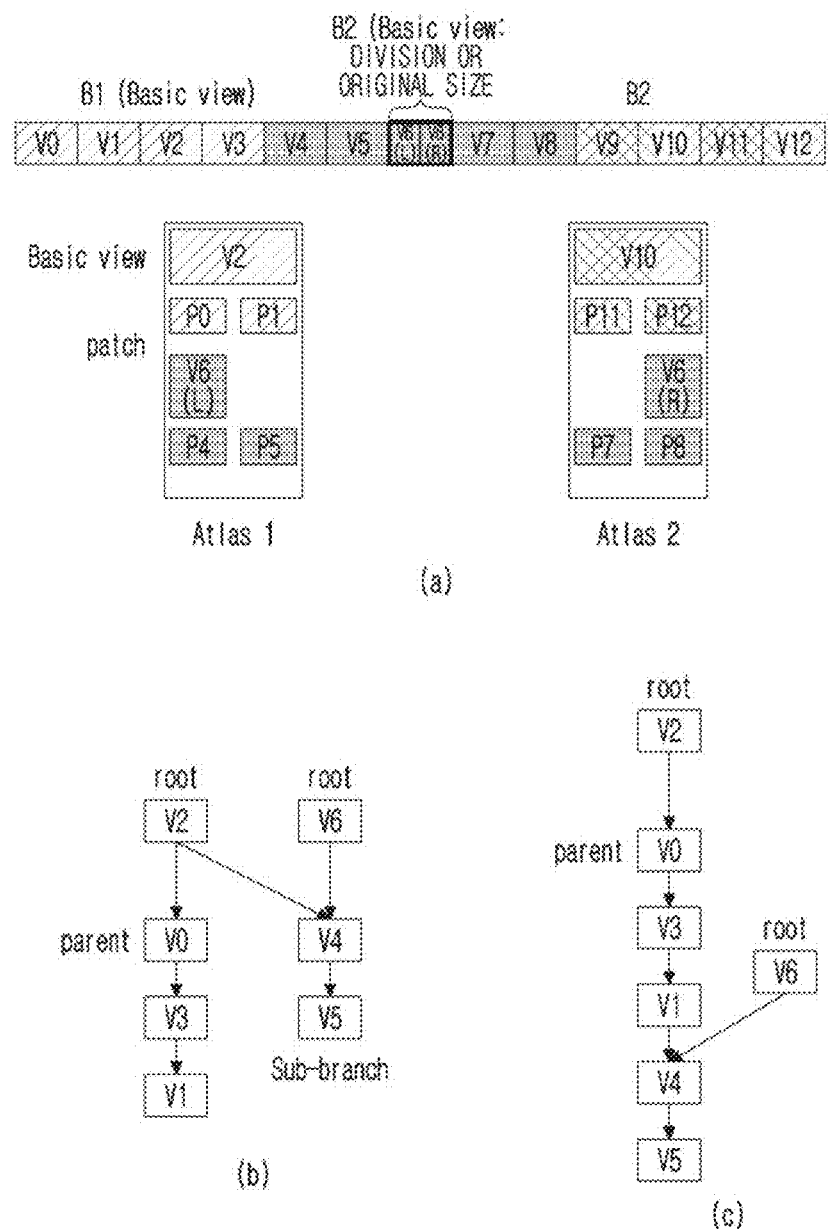

FIGS. 17 and 18 are views illustrating an example in which the number of atlas is less than the number of groups.

In the example of (a) of FIG. 17, view images are classified into two groups and one atlas is generated for each group. In this case, each group may include a basic view. In addition, as in the example shown in (b) of FIG. 17, the basic image of each group may be set to a root and a pruning graph of each group may be constructed.

In the example of (a) of FIG. 17, view images are classified into three groups but two atlases may be generated. Each group may include a basic view. Fundamentally, the basic image greatly contributes to rendering quality improvement.

In consideration of the characteristics of the basic image, the basic image is divided into a plurality of regions and then a sub-branch pruning graph using the divided image as a root may be constructed.

In the example of (a) of FIG. 18, a basic image B2 (that is, a view image v6) is divided into two regions B2(L) and B2(R).

After the basic image B2 is divided into two regions, a son-branch using the divided basic image as a root may be added to an existing pruning graph. For example, a sub-branch in which the divided basic image is set as a root may be added to a pruning graph in which the other basic image is set as a root.

In this case, each of the divided images may be added to different pruning graphs. For example, a first divided image B2(L) is added to a pruning graph in which the basic image B1 (that is, the view image v2) is set as a root, and a second divided image B2(R) may be added to a pruning graph in which the basic image B3 (that is, the views image v10) is set as a root.

The sub-branch serves to form a separate sub-group on a pruning graph and contributes to rendering quality improvement. On the sub-branch, the divided basic image may be set as a root of additional images belonging to the same group as the divided basic image. For example, the sub-branch may be formed by branching from the root on the existing pruning graph (see (b) of FIG. 18).

However, when the sub-branch is added to the pruning graph, the amount of data required to encode information related to the pruning graph may increase. Therefore, a method of adding a basic view greatly affecting rendering quality to an arbitrary node while maintaining a single pruning graph may be considered.

That is, instead of setting the divided basic image as the sub-branch, the divided basic image may be added to an arbitrary node on the pruning graph. For example, on the pruning graph, a branch may be added such that the divided basic image is set as a root of additional images belonging to the same group as the basic image. For example, in (c) of FIG. 18, a node is added such that the divided basic image B2(L) is set as a root of a view image v4 and a view image v5 belonging to the same group as a basic image B2, on the pruning graph in which additional images are arranged in order of v0, v3, v1, v4 and v5.

Division of a basic image may mean that the basic image is equally or non-equally physically divided based on a division line in a specific direction. For example, in the example shown in (a) of FIG. 18, the basic image B2 may be divided into a left region image B2(L) and a right region image B2(R) having the same size.

The basic image may be divided such that the divided regions include overlapped data. For example, the basic image may be divided such that the right boundary of the left region image B2(L) and the left boundary of the right region image B2(R) do not coincide.

Alternatively, after information is extracted from the basic image, the basic image may be divided in units of regions similar in semantics. Dividing the image in units of regions similar in semantics may be referred to as semantic region division.

Information indicating whether to divide the basic image may be encoded and signaled. In addition, when the basic image is divided, information on at least one of a method of dividing a basic image, the number of divided images or identifiers assigned to the divided images may be additionally encoded.

Instead of constructing a sub-branch with the divided basic image, a sub-branch may be constructed based on a basic image having an original size. For example, in the example shown in (b) and (c) of FIG. 18, instead of the left division image B2(L), a sub-branch may be added to a pruning graph in which a basic image B1 is set as a root, using a basic image B2. Likewise, instead of a right division image B2(L), a sub-branch may be added to a pruning graph in which a basic image B3 is set as a root, using a basic, image B2.

However, when the sub-branch is constructed based on the basic image, one basic image may be overlapped and included in a plurality of atlases. Therefore, it may be determined whether to divide the basic image based on at least one of the size or resolution of the atlas. For example, when the resolution of the atlas is large (that is, the capacity of data which may be included in the atlas is large), a sub-branch may be constructed without dividing the basic image. In contrast, when the resolution of the atlas is small, a sub-branch may be constructed using the divided basic image.

As another example, after one view image is divided into a plurality of regions, the divided view images may be set as root images of different pruning graphs. For example, a first atlas may be generated based on a pruning graph in which a left region image of a particular view image is set as a basic image and a second atlas may be generated based on a pruning graph in which a right region image of a particular view image is set as a basic image.

Metadata for a pruning graph may be encoded and signaled.

FIG. 19 is a view illustrating a syntax structure including information on a pruning graph.

In the example of FIG. 19, a syntax pp_is_root_flag[v] indicates whether a view image with an index of v is a basic image (that is, a root node). The value of the flag pp_is_root_flag[v] being 1 indicates that the view image is a root node and the value of the flag pp_is_root_flag[v] being 0 indicates that the view image is not a root node.

A syntax pp_num_parents_minus1[v] represents the number of parent node images of a view image with an index of v. For example, the syntax pp_num_parents_minus1[v] may represent the number of parent node images minus 1.

A syntax pp_parent_id[v][i] represents the identifier of an i-th parent node of an image with an index of v.

In consideration of the characteristics of content which varies over time, a pruning graph may be updated for each predetermined period. For example, the pruning graph may be updated in units of a group of picture (GOP) or in units of an intra period.

Alternatively, information indicating whether to update a pruning graph may be encoded and signaled.

FIG. 20 is a view illustrating a syntax structure including a syntax indicating whether information on a pruning graph is updated.

In the example of FIG. 20, a syntax came_update_pruning_parents_flag represents whether to update the pruning graph. When the flag came_update_pruning_parents_flag is 1, pruning_parents( ) shown in FIG. 19 may be called for each view image to reset at least one of whether it is a basic image, the number of parent nodes, a pruning order or the identifier of a parent node.

While a plurality of bitstreams is encoded, the number of decoders included in the immersive video presentation apparatus may not be sufficient to decode all the plurality of bitstreams. In this case, in the immersive video presentation apparatus, in order to divide and decode some of the plurality of bitstreams, atlases of a plurality of groups may be merged into one atlas.

Figure 21:
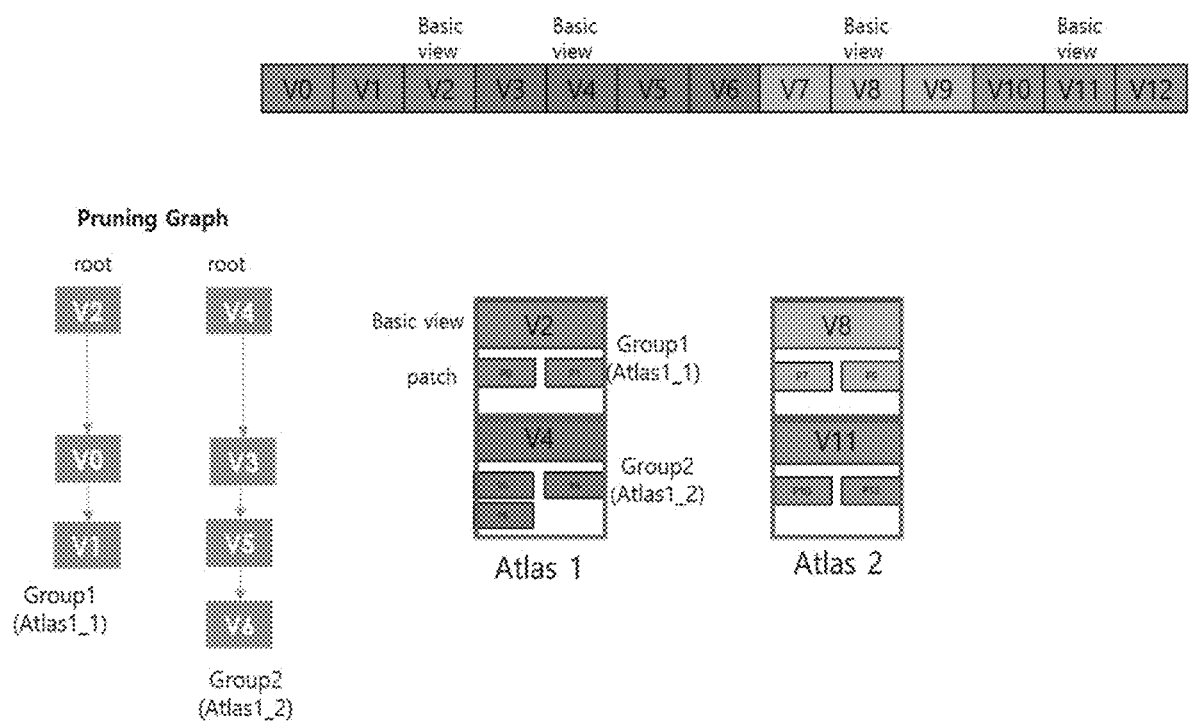
FIG. 21 is a view illustrating an example in which atlases of a plurality of groups are packed into one atlas.

FIG. 21 is a view illustrating an example in which atlases of a plurality of groups are packed into one atlas.

As shown in FIG. 21, after view images in a group may be divided into a basic image and an additional image, it is possible to generate an atlas. That is, the atlas of each group may be composed of one or more basic images and patches generated based on the basic image.

Meanwhile, in the decoder, atlases of a plurality of groups may be packed into one atlas to enable divisional decoding. For example, as shown in FIG. 21, an atlas of groups and an atlas of group2 may be repacked into one image, thereby generating Atlas1. In FIG. 21, Atlas1_1 indicates the atlas of group1 and Atlas1_2 indicates the atlas of group2.

When the atlas is generated by packing a plurality of atlases, region division information of the plurality of atlases in the atlases may be encoded into metadata and signaled. For convenience of description, the atlas packed into the atlas may be referred to as a sub-atlas or a sub-image.

FIG. 22 is a view illustrating a syntax structure including region division information.

Information indicating whether region division information of an atlas is encoded may be signaled through a bitstream. For example, a 1-bit flag may be signaled through a video parameter set. When an atlas includes a plurality of sub-atlases, the flag may be set to true and region division information for each atlas may be parsed. If not, the flag may be set to false and encoding/decoding of the region division information may be omitted.

The region division information may include at least one of information on the number of sub-atlases in the atlas (that is, the number of groups), identification information of the sub-atlas (that is, identification information of the group) or region information in the sub-atlas.

For example, in the example of FIG. 22, a syntax pir_num_packed_group_minus1 represents the number of sub-atlases in the atlas. The syntax pir_num_packed_group_minus1 represents the number of sub-atlases minus 1.

A syntax_pir_group_id[i] represents the identifier of each sub-atlas.

A syntax pir_num_regions_minus1[k] represents the number of regions in the sub-atlas. A variable K is set equally to an identifier (that is, pir_gorup_id) assigned to the sub-atlas.

Information on each region in the sub-atlas may be additionally encoded and signaled. For example, a syntax pir_codec_type_idc[k] represents the decoder standard of each region in the sub-atlas. The decoder standard indicates whether a used codec is HEVC or VVC. When the value of the syntax pir_codec_type_idx is 0, this indicates that an HEVC codex is applied, and, when the value of the syntax pir_codec_type_idx is 1, this indicates that a VVC codec is applied. When the standard of the region is HEVC (that is, pir_codec_type_idc[k]==0), each region in the sub-atlas may be processed as a tile. In this case, at least one of a syntax pir_top_left_tile_idx[k][i] or a syntax pir_bottom_right_tile_idx[k][i] indicating the position information of the tile may be additionally encoded. In contrast, when the standard of the region is VVC (that is, pir_codec_type_idc[k]==1), each region in the sub-atlas may be processed as a sub-picture. In this case, a syntax pi_sub_picture_id which is the identification information of a subpicture may be additionally encoded.

According to the present disclosure, it is possible to provide a method of grouping view images into a plurality of groups.

In addition, according to the present disclosure, it is possible to reduce the amount of transmitted data through bitstream encoding/decoding for each group.

It will be appreciated by persons skilled in the art that that the effects that can be achieved through the present disclosure are not limited to what has been particularly described hereinabove and other advantages of the present disclosure will be more clearly understood from the following detailed description.

The names of the syntax elements introduced in the above-described embodiments are only temporarily assigned to describe the embodiments of the present disclosure. The syntax elements may be called names different from those proposed in the present disclosure.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a machine language code formatted by a compiler but also a high level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from, the above description.

Therefore, the spirit of the present disclosure shall not be limited to the above-described embodiments, and the entire scope of the appended claims and their equivalents will fall within the scope and spirit of the disclosure.

What is claimed is:

1. A method of producing an immersive video, the method comprising:
    decoding an atlas;
    determining whether the atlas is constructed by packing a plurality of sub-atlases; and
    producing a viewport image using the atlas,
    wherein, in response to the atlas constructed by packing the plurality of sub-atlases, packing information of the atlas is decoded from a bitstream,
    wherein the packing information comprises position information of each of the plurality of sub-atlases,
    wherein a flag, indicating whether a specific view is capable of being completely produced by the atlas, is decoded from the bitstream, and
    wherein, according to a value of the flag, it is determined whether an additional atlas is used in addition to the atlas to produce the viewport image.

2. The method of claim 1, further comprising decoding first mapping information between a spatial region and a view image,
    wherein the first mapping information comprises identifier information of a spatial region and identifier information of a group corresponding to the spatial region, the group consisting of at least one view.

3. The method of claim 2, further comprising decoding second mapping information between an atlas and the group,
    wherein the second mapping information comprises identification information of a tile in the atlas corresponding to the group.

4. The method of claim 1, further comprising decoding quality information of a view image,
    wherein the quality information is a 1-bit flag indicating high quality or low quality.

5. The method of claim 4,
    wherein the quality information is decoded for each of a texture component and a depth component of the view image.

6. The method of claim 1, further comprising decoding frame order information of atlases,
    wherein the frame order information comprises information on the number of atlases in an access unit and order information of the atlases.

7. The method of claim 1, further comprising decoding pruning graph information of a view image,
    wherein the pruning graph information comprises at least one of a flag indicating whether the view image is a root node or parent node information of the view image.

8. The method of claim 7, further comprising decoding a flag indicating whether to update previously decoded pruning graph information for the view image.

9. The method of claim 8, further comprising encoding first mapping information between a spatial region and a view image,
    wherein the first mapping information comprises identifier information of a spatial region and identifier information of a group corresponding to the spatial region.

10. The method of claim 9, further comprising encoding second mapping information between an atlas and the group,
    wherein the second mapping information comprises identification information of a tile in the atlas corresponding to the group.

11. A method of processing an immersive video, the method comprising:
    grouping view images;
    generating an atlas for each group; and
    determining whether a plurality of atlases is repacked into one atlas,
    wherein, in response to the repacking being performed, packing information of the repacked atlas is additionally encoded,
    wherein the method further comprises encoding a flag indicating whether a view image is capable of being completely reproduced by the repacked atlas.

12. The method of claim 11, further comprising encoding quality information of a view image,
    wherein the quality information is a 1-bit flag indicating high quality or low quality.

13. The method of claim 12, further comprising encoding a flag indicating whether to update previously decoded pruning graph information for the view image.

14. The method of claim 11, further comprising encoding frame order information of atlases,
    wherein the frame order information comprises information on the number of atlases in an access unit and order information of the atlases.

* * * * *